United States Patent
Jeong et al.

(10) Patent No.: US 10,953,357 B2
(45) Date of Patent: Mar. 23, 2021

(54) OIL MIST FILTER AND AIR CLEANER HAVING THE SAME

(71) Applicant: Samsung Electronics Co., Ltd., Suwon-si (KR)

(72) Inventors: Hyun-ku Jeong, Yongin-si (KR); Young-chul Ko, Suwon-si (KR); Hyun-joo Kim, Suwon-si (KR); Jeong-su Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 251 days.

(21) Appl. No.: 16/053,143

(22) Filed: Aug. 2, 2018

(65) Prior Publication Data
US 2019/0046908 A1    Feb. 14, 2019

(30) Foreign Application Priority Data
Aug. 9, 2017    (KR) .................. 10-2017-0100838

(51) Int. Cl.
*B01D 50/00*    (2006.01)
*B01D 45/08*    (2006.01)
(Continued)

(52) U.S. Cl.
CPC ............. *B01D 45/08* (2013.01); *B01D 46/10* (2013.01); *B01D 46/16* (2013.01); *B01D 50/002* (2013.01);
(Continued)

(58) Field of Classification Search
CPC ...... B01D 45/08; B01D 50/002; B01D 46/10; B01D 46/0023; B01D 46/0054;
(Continued)

(56) References Cited

U.S. PATENT DOCUMENTS 1,351,433 A * 8/1920 Nelis .................... F22B 37/303
                                                         122/491
2,083,764 A * 6/1937 Weisgerber ............ B01D 45/08
                                                         55/322
(Continued)

FOREIGN PATENT DOCUMENTS

CA    3014500 A1   8/2017
CN    1704690 A   12/2005
(Continued)

OTHER PUBLICATIONS

Notification of the First Office Action dated Jan. 5, 2021 in connection with Chinese Application No. 201810877009.9, 21 pages.

*Primary Examiner* — Dung H Bui

(57) ABSTRACT

An air cleaner and an oil mist filter are disclosed. The air cleaner includes a main body, and a filter device. The filter device includes at least one dust filter configured to filter external air and an oil mist filter configured to filter oil mist. The oil mist filter includes a stationary filter including a plurality of first baffles, and a movable filter including a plurality of second baffles respectively corresponding to the plurality of first baffles. The movable filter is movably disposed on one side of the stationary filter to be moved to first or second position. The oil mist filter is provided with a first air path in the first position, the first and second baffles are positioned closest to each other. The oil mist filter is provided with a second air path in the second position, the first and second baffles are farthest away from each other.

20 Claims, 25 Drawing Sheets

(51) Int. Cl.
*F24C 15/20* (2006.01)
*B01D 46/10* (2006.01)
*B01D 46/16* (2006.01)
*B01D 46/00* (2006.01)
*B01D 46/42* (2006.01)
*B01D 46/40* (2006.01)
*F24F 13/28* (2006.01)

(52) U.S. Cl.
CPC ...... *F24C 15/2035* (2013.01); *B01D 46/0023* (2013.01); *B01D 46/0054* (2013.01); *B01D 46/40* (2013.01); *B01D 46/42* (2013.01); *F24F 13/28* (2013.01); *Y10S 55/36* (2013.01)

(58) Field of Classification Search
CPC ........ B01D 46/40; B01D 46/42; B01D 45/16; F24C 15/2035; F24C 15/20; F24F 13/28; Y10S 55/36
See application file for complete search history.

(56) References Cited

U.S. PATENT DOCUMENTS

| | | | | |
|---|---|---|---|---|
| 3,566,585 | A * | 3/1971 | Voloshen | F24C 15/2035 55/435 |
| 3,616,744 | A * | 11/1971 | Jensen | F24C 15/20 126/299 E |
| 3,910,782 | A * | 10/1975 | Struble | B01D 45/08 55/444 |
| 3,945,812 | A * | 3/1976 | Doane | B01D 45/08 95/272 |
| 4,101,299 | A * | 7/1978 | Bertucci | E04B 9/023 96/228 |
| 4,189,990 | A * | 2/1980 | Kittler | F24C 15/20 454/251 |
| 5,302,174 | A * | 4/1994 | Guetersloh | B01D 45/08 55/444 |
| 5,342,422 | A * | 8/1994 | Wimbock | B01D 45/08 55/444 |
| 6,454,825 | B1 * | 9/2002 | Cheimets | B01D 45/08 55/446 |
| 6,656,244 | B1 * | 12/2003 | Galassi | B01D 45/06 55/444 |
| 6,840,975 | B2 * | 1/2005 | Bohacik | B01D 45/08 126/299 D |
| 7,241,326 | B2 | 7/2007 | Han et al. | |
| 7,581,539 | B2 | 9/2009 | Aviles | |
| 7,947,123 | B2 * | 5/2011 | Kwok | F24C 15/2035 95/267 |
| 9,278,359 | B2 * | 3/2016 | Park | B03C 3/017 |
| 9,403,106 | B2 * | 8/2016 | Oosthuizen | B01D 45/04 |
| 2005/0022482 | A1 * | 2/2005 | Bockle | B01D 45/16 55/321 |
| 2005/0268583 | A1 | 12/2005 | Han et al. | |
| 2006/0157048 | A1 * | 7/2006 | Heilman | F24C 15/2035 126/299 R |
| 2007/0163216 | A1 * | 7/2007 | Smasal | B01D 45/08 55/446 |
| 2009/0019822 | A1 | 1/2009 | Feisthammel et al. | |
| 2013/0133639 | A1 * | 5/2013 | Lee | B01D 45/06 126/299 D |
| 2015/0101588 | A1 * | 4/2015 | Yoon | F24C 15/2035 126/299 D |
| 2015/0135661 | A1 * | 5/2015 | MacDonald | B01D 45/08 55/440 |
| 2016/0121251 | A1 * | 5/2016 | Baek | B01D 46/0086 95/25 |

FOREIGN PATENT DOCUMENTS

| | | | |
|---|---|---|---|
| CN | 101166566 A | 4/2008 | |
| DE | 102005019831 A1 | 11/2006 | |
| EP | 2859931 A1 | 4/2015 | |
| JP | 2000-189532 A | 7/2000 | |
| JP | 3193422 U | 10/2014 | |
| JP | 5827087 B2 | 12/2015 | |
| JP | 2018-054185 A | 4/2018 | |
| KR | 20-0342547 Y1 | 2/2004 | |
| KR | 10-0834585 B1 | 6/2008 | |
| WO | WO-2009106804 A2 * | 9/2009 | .......... F24C 15/2035 |

\* cited by examiner

OIL MIST FILTER AND AIR CLEANER HAVING THE SAME

CROSS-REFERENCE TO RELATED APPLICATIONS AND CLAIM OF PRIORITY

This application claims priority from Korean Patent Application No. 10-2017-0100838, filed on Aug. 9, 2017 in the Korean Intellectual Property Office, the disclosure of which is incorporated herein by reference in its entirety.

BACKGROUND

1. Field

Devices consistent what is disclosed herein relates to an air cleaner, and more particularly, to an air cleaner provided with an oil mist filter configured to filter the air including fine oil mist generated during cooking of fried foods in a kitchen as well as normal air cleaning function.

2. Description of the Related Art

Recently, growing concerns are focused on harmfulness of particulate matters (hereinbelow, "fine dusts") such as volatile organic compounds (VOCs), oil mist generated during cooking at the kitchen, and so on.

The volatile organic compounds are selectively adsorbed onto a deodorizing filter, but oil mist, which is the particulate matter having various sizes, can be collected only through a high efficiency particulate air (HEPA) filter. The HEPA filter collects oil mists having particle sizes of up to 0.3 µm.

Meanwhile, when the oil mist is collected with the HEPA filter, lifespan of the HEPA filter is reduced, and the filtering function of the HEPA filter is considerably deteriorated, in which case the oil mist is attached to other filters provided for other functions (e.g., dust filter, charge filter, deodorizing filter, antifungal filter or the like), thus serving as a source of contaminants. Accordingly, use of an air cleaner in a kitchen is not currently recommended, because this damages every filter and reduces lifespan.

Accordingly, removing the oil mist generated during cooking in a kitchen should depend on a hood. However, the hood filters at best 55% to 70% of oil collection efficiency, and air quality of a kitchen is deteriorated as the non-filtered oil mist spreads.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective of the present disclosure is to provide an air cleaner that may be used in both a living room and a kitchen.

In order to achieve the objects mentioned above, an air cleaner is provided, which may include a main body configured to forcibly intake external air with a fan disposed therein and discharge through an outlet, and a filter device comprising at least one dust filter disposed in back of an inlet and configured to filter the external air introduced through the inlet, and an oil mist filter configured to filter the oil mist, in which the oil mist filter includes a stationary filter including a plurality of first baffles disposed in parallel at certain interval, and a movable filter including a plurality of second baffles disposed in parallel at certain interval and respectively corresponding to the plurality of first baffles, the movable filter is movably disposed on one side of the stationary filter to be moved to first or second positions, and the oil mist filter is provided with a first air path in the first position in which the first and second baffles corresponding to each other are positioned closest to each other to minimize interference with air flow, and provided with a second air path in the second position in which the first and second baffles corresponding to each other are farthest away from each other to maximize interference with the air flow.

One of the movable filter and the stationary filter may include a guide projection, and the other of the movable filter and the stationary filter comprises a sliding groove with which the guide projection is slidably engaged in a horizontal direction.

One of the movable filter and the stationary filter may include a guide rail projecting in a direction farther away from, or closer to the stationary filter, and the other of the movable filter and the stationary filter may include a guide hole into which the guide rail is slidably inserted.

The movable filter may be movably hinge-connected to the stationary filter in a diagonal direction through a plurality of hinge connection parts.

The plurality of first and second baffles may have a groove shape in cross section which is bent for at least once, or a circular-arc shape in cross section.

The movable filter may be connected to a mode selecting member to be moved to the first position or the second position by the mode selecting member exposed outside the front cover.

According to some embodiments, the air cleaner may additionally include a controller disposed within the main body to control a motor, an operating panel disposed outside the main body to receive an input of a user command, and an actuator controlled by the controller according to the user command to the operating panel, in which the movable filter may be connected to the actuator so as to receive driving force from the actuator, and moved to the first position or the second position according to driving of the actuator.

Further, in order to achieve the objects mentioned above, an oil mist filter is provided, which may include a stationary filter including a plurality of first baffles disposed in parallel at certain interval, and a movable filter including a plurality of second baffles disposed in parallel at certain interval and respectively corresponding to the plurality of first baffles, in which the movable filter may be movably disposed on one side of the stationary filter to be moved to first or second positions, and between the first and second baffles, may be provided with a first air path in the first position in which the first and second baffles corresponding to each other are positioned closest to each other to minimize interference with air flow, and provided with a second air path in the second position in which the first and second baffles corresponding to each other are farthest away from each other to maximize interference with the air flow.

Interval between the plurality of first baffles may be same as that between the plurality of second baffles.

The movable filter may be moved in a horizontal direction or a vertical direction with respect to the stationary filter.

The movable filter may be hinge-connected to the stationary filter and moved in a diagonal direction.

The plurality of second baffles may be disposed symmetrically with the plurality of corresponding first baffles, respectively.

The plurality of first and second baffles may have any of V-shape, Chevron shape, and circular-arc shape in cross section.

The plurality of first and second baffles may be bent for at least once to have a groove shape in cross section, and the groove shape in cross section may have an opening, and the first baffles and the second baffles corresponding to each other may be disposed with each of the openings facing each other.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Certain exemplary embodiments of the present inventive concept will now be described in greater detail with reference to the accompanying drawings in order to sufficiently understand constitution and effects of the present disclosure. However, the present disclosure may not limit embodiments described below; it may be implemented in various forms and added with various modifications. The specification of the embodiments may merely complete the disclosure of the present invention, and may be provided to completely inform the scope of the present invention of a person skilled in the art. Constituent elements of the accompanying drawings are magnified and illustrated to be greater than actual size, and each ratio of constituent elements may be exaggerated or reduced.

The expression, "first," "second," and so on may be used in describing a variety of elements, but these elements should not be limited to the expression. The expressions may be used only for the purpose of distinguishing one element from another. For example, without departing from the scope of the present disclosure, a first component may be referred to as a second component, and similarly, the second component may also be referred to as the first component.

Terms used in embodiments of the present disclosure may be interpreted as meaning which is normally known to a person skilled in the art unless they are defined otherwise.

The following will sequentially describe brief constitution of an air cleaner according to an embodiment and detailed constitution of an oil mist filter with reference to drawings.

Figure 1:
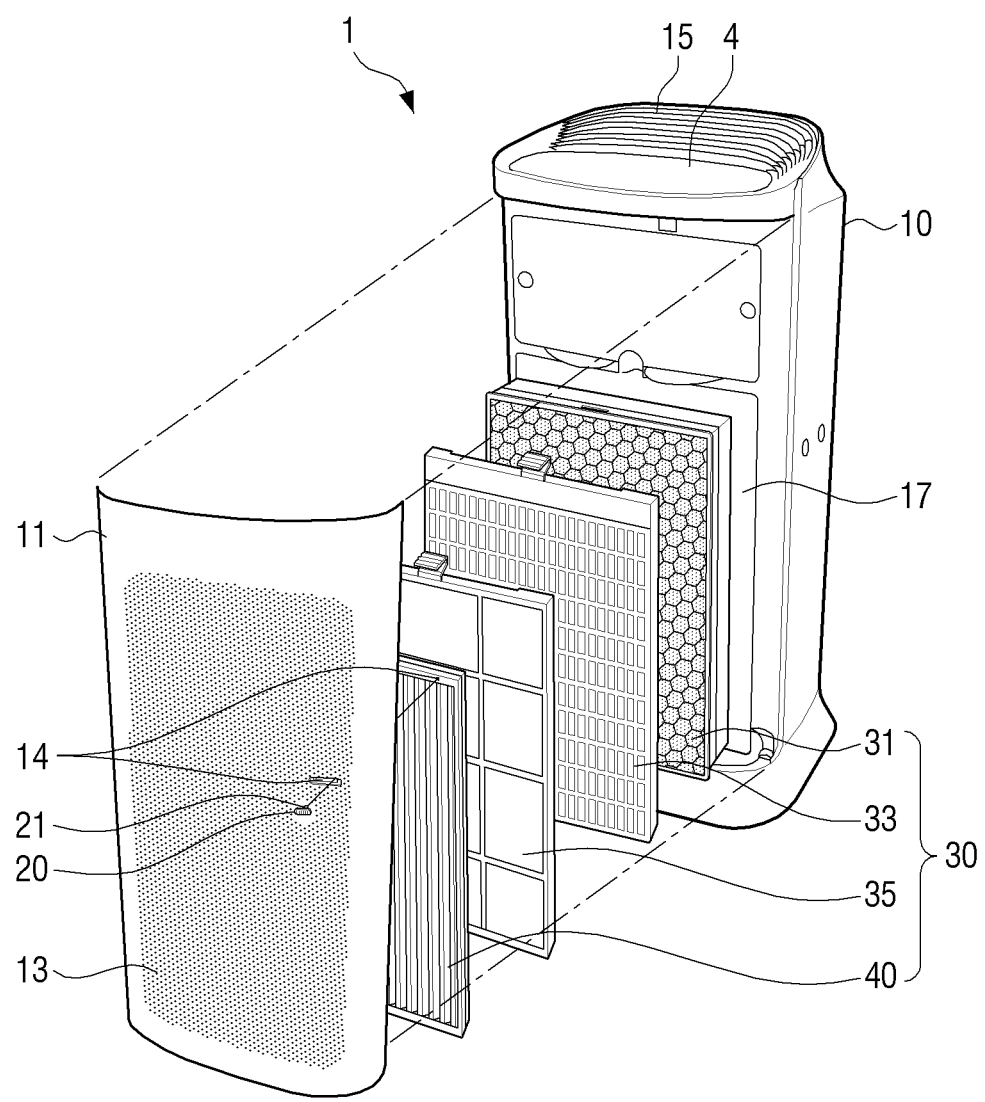
FIG. 1 illustrates an exploded perspective view of an air cleaner according to an embodiment of the present disclosure.
Figure 14:
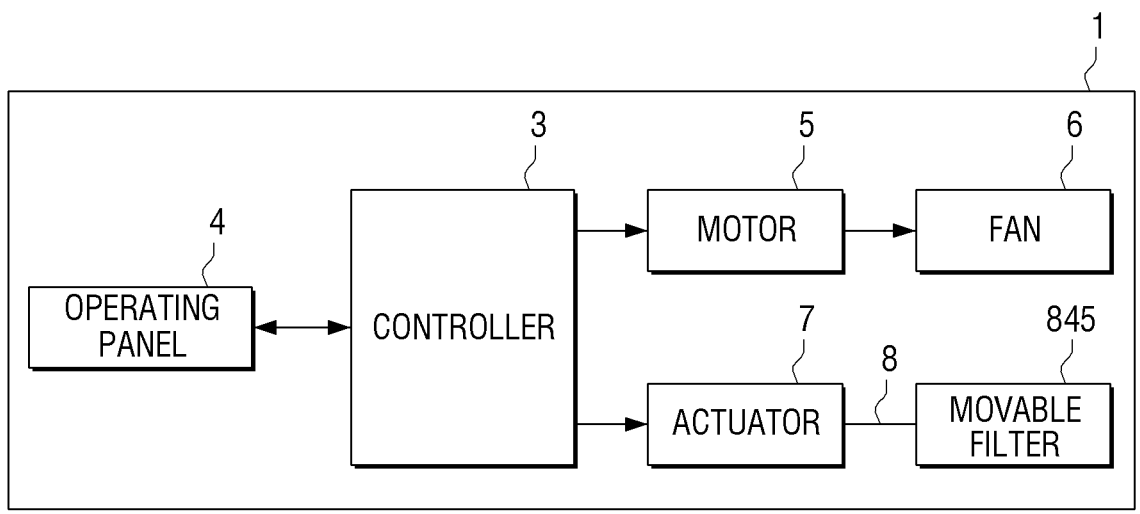
FIG. 14 illustrates a block diagram of an oil mist filter with an actuator according to an embodiment of the present disclosure.

FIG. 1 illustrates an exploded perspective view of an air cleaner according to an embodiment of the present disclosure. FIG. 1, the air cleaner 1 according to an embodiment may include a main body 10 having therein a fan 6 (FIG. 14)

and a motor 5 (FIG. 14) to drive the fan, and a filter device 30 removably disposed within the main body 10.

The main body 10 may include a controller 3 (FIG. 14) to control the motor 5, and an operating panel 4 to receive a user input to turn on/off and to perform various functions of the air cleaner 1.

The operating panel 4 may be disposed on an upper portion of the main body 10 to provide an easy access, but not limited thereto. For example, the operating panel 4 may be disposed on a side or a rear side of the main body 10. The operating panel 4 may be configured as a touch screen so as to display user input and operating state together. Alternatively, the operating panel 4 may include a separate display and a plurality of input keys arranged around the display.

A front cover 11 may be removably coupled to a front portion of the main body 10. The front cover 11 may have a plurality of intake holes 13 formed therein, and an insertion groove 14 formed in one side, through which a mode selecting knob 20 can be inserted in a sliding manner.

The mode selecting knob 20 may be provided for moving a movable filter 45 (to be described below) in left and right directions, and a coupling projection 21 formed on a rear side to be engaged with a coupling hole 49 of the movable filter 45. The mode selecting knob 20 may be preferably disposed while being exposed outside the front cover 11 for easy access of a user.

In this example, the front cover 11 may preferably have, around the insertion groove 14, characters, symbols or the like that inform the air cleaning mode and oil mist collecting mode according to moving position of the mode selecting knob 20, which may be printed on the front cover 11, or integrated with the front cover 11 by imprinting or embossing.

The main body 10 may forcibly intake external air of the main body 10 into the main body 10 through a plurality of intake holes 13 on the front cover 11, as the fan 6 is driven. In this example, dust or oil mist included in the external air may be collected in a filter device 30 as it passes through the filter device 30.

The main body 10 has an outlet hole 15 formed in an upper portion of the main body 10 to discharge the purified air through the filter device 30 to outside the main body 10. In this example, the outlet hole 15 may not be limited to the upper portion of the main body 10, but may be formed on a side or a rear side of the main body, for example.

The main body 10 may have a receiving groove 17 in a front inner side to receive the filter device 30. In this example, the fan 6 may be preferably disposed downstream of the filter device 300 on an intake path.

The filter device 30 may include, disposed in sequence in a direction farther away from the main body 10, an integrated filter 31, a filter saver 33, a pre-filter 35 and an oil mist filter 40.

The integrated filter 31 may be formed of a deodorizing and antifungal material that is capable of collecting ultrafine dusts. The integrated filter 31 may have a honeycomb structure as illustrated in FIG. 1, but it may not be limited thereto. A filter saver 33 may collect dust through charging. The pre-filter 35 may be configured with a non-woven fabric or a metal film or net having very densely perforated meshes for the filter. The oil mist filter 40 may collect oil mist that can be mainly generated during cooking with oil such as olive oil in a kitchen.

The air cleaner 1 according to an embodiment including the oil mist filter 40 may thus operate in the oil mist collecting mode as well as the normal air cleaning mode. The air cleaning mode and the oil mist collecting mode may be switched by moving the movable filter 45 in left and right directions with the mode selecting knob 20.

In this example, the air path of the oil mist filter 40 may be varied to different shapes in the respective modes. That is, the air path of the oil mist filter 40 may be varied to a simple structure to minimize interference with the air flow in the air cleaning mode, and varied to a complex structure to maximize interface with the air flow in the oil mist collecting mode to optimize the collection of the oil mist.

Figure 2:
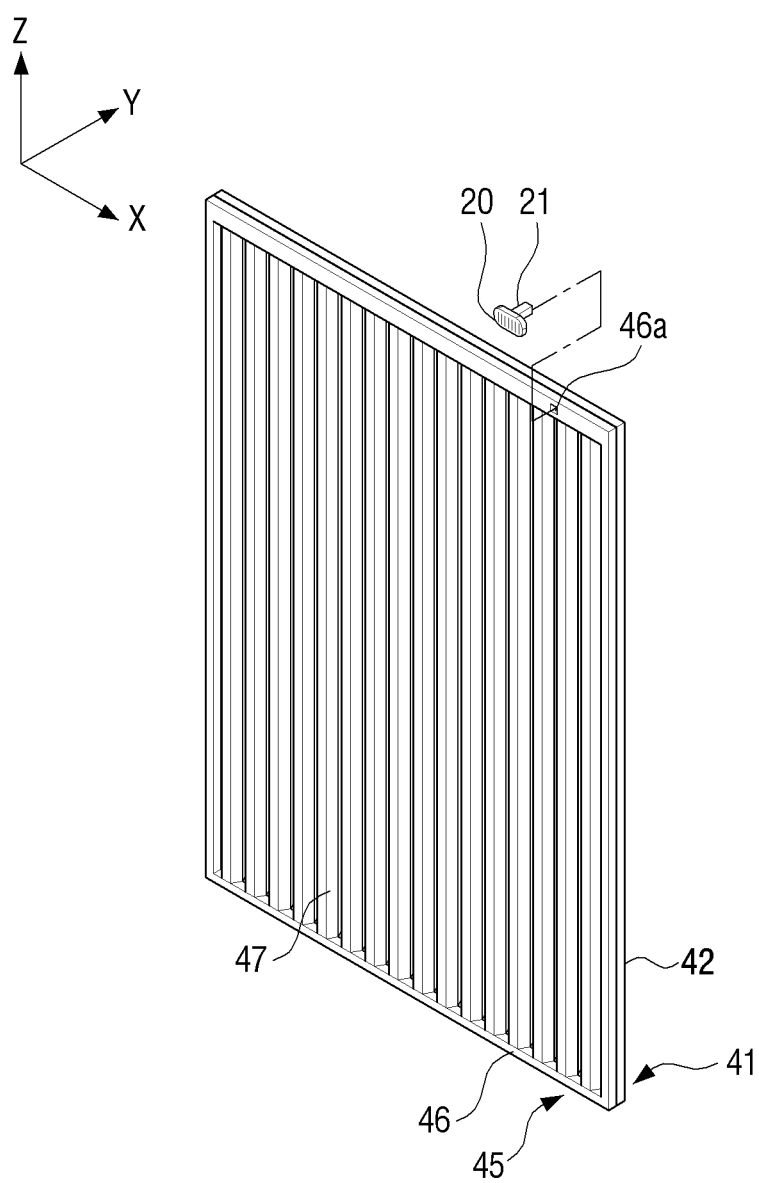
FIG. 2 illustrates a perspective view of an oil mist filter being in a coupled state, according to an embodiment of the present disclosure.
Figure 3A:
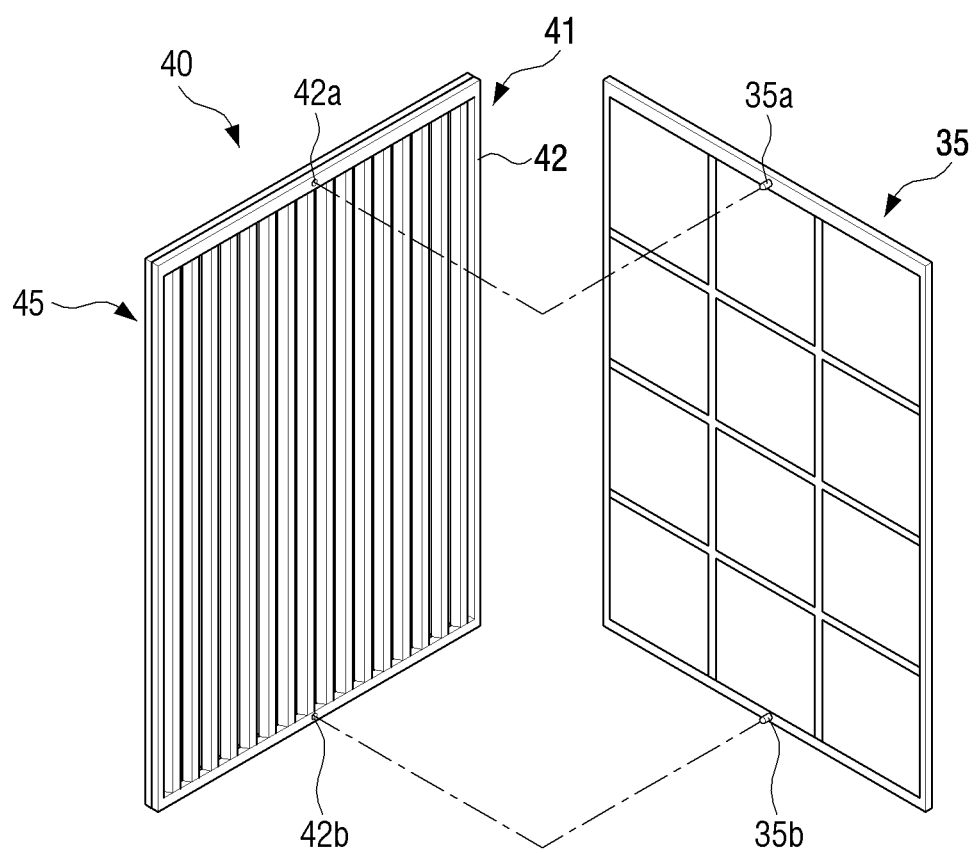
FIG. 3A illustrates a perspective view of a structure for coupling between a pre-filter and an oil mist filter according to an embodiment of the present disclosure.
Figure 3B:
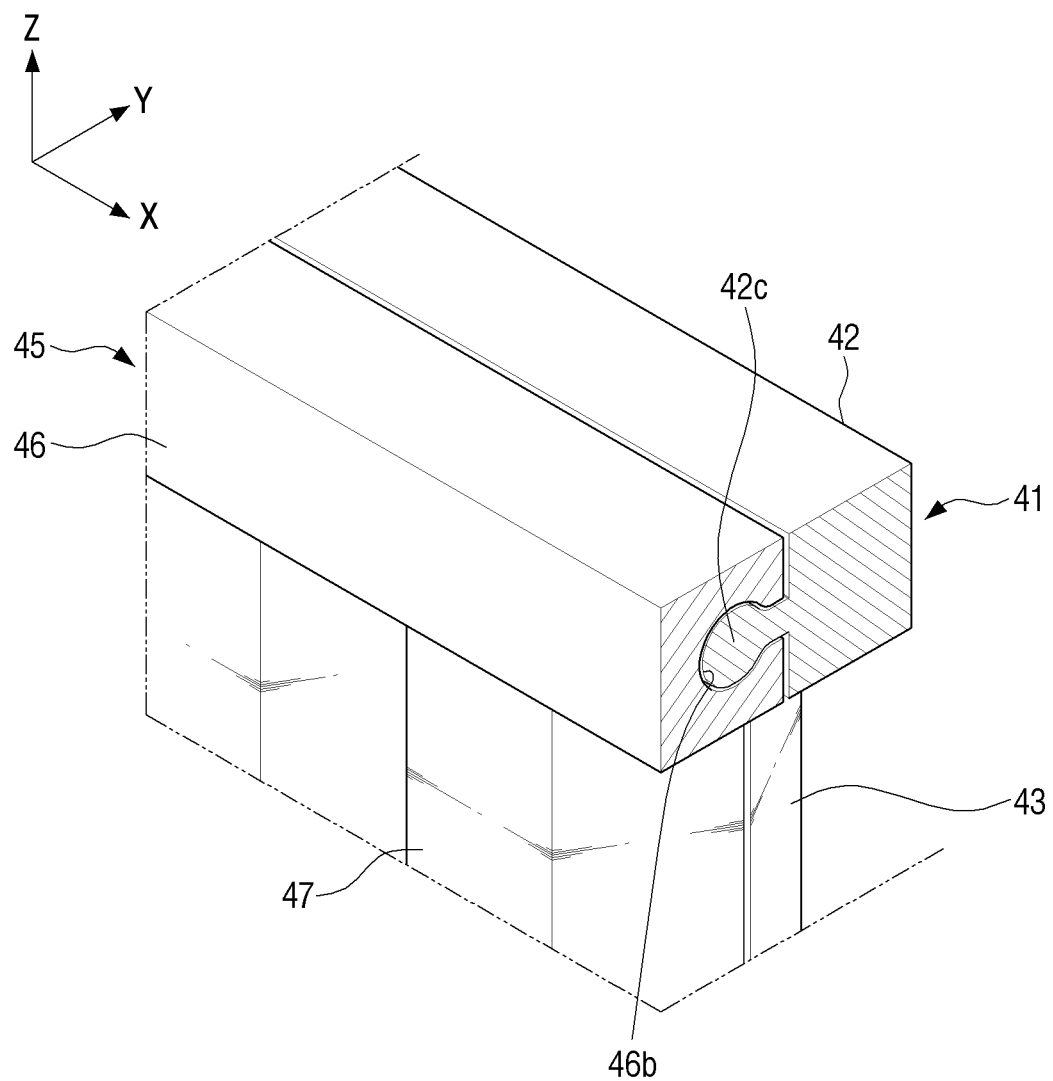
FIG. 3B illustrates a cross-sectional view taken along line III-III of FIG. 2, of a slidable coupling structure between a stationary filter and a movable filter according to an embodiment of the present disclosure.
Figure 4A:
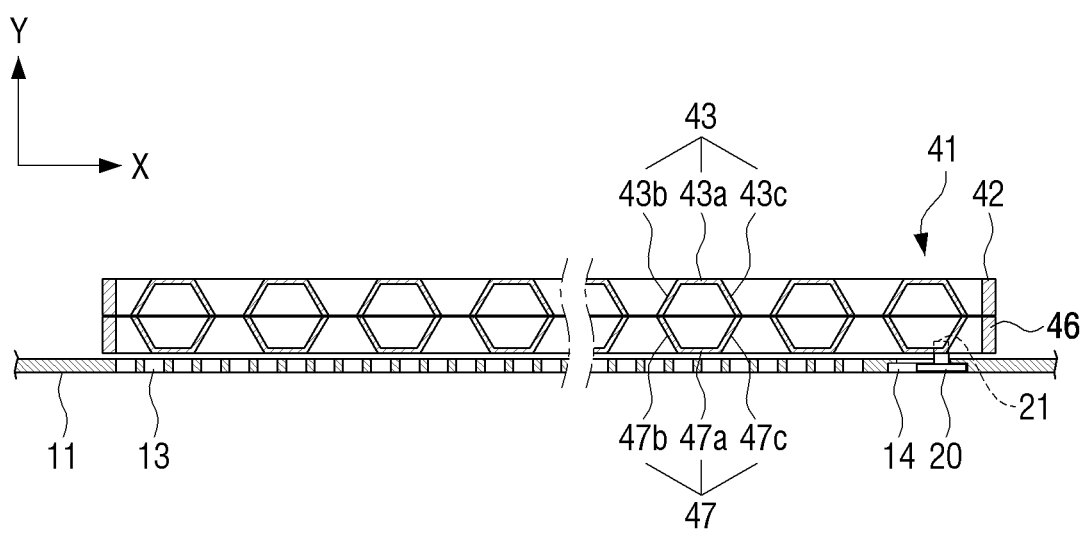
FIG. 4A illustrates a cross-sectional view taken on line IV-IV of FIG. 2, of a position of a movable filter with respect to a stationary filter in an air cleaning mode according to an embodiment of the present disclosure.
Figure 4B:
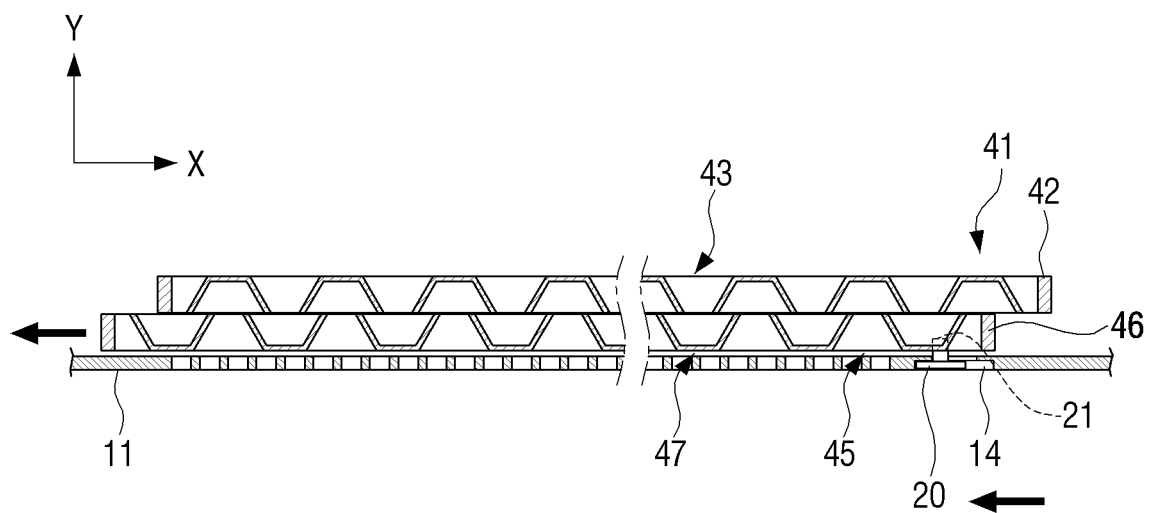
FIG. 4B illustrates a view of a position of a movable filter with respect to a stationary filter in an oil mist collecting mode according to an embodiment of the present disclosure.

The following will specifically explain constitution of an oil mist filter 40 by referring to FIGS. 2 to 4B. FIG. 2 illustrates a perspective view of an oil mist filter being in a coupled state, according to an embodiment of the present disclosure. FIG. 3A illustrates a perspective view of a structure for coupling between a pre-filter and an oil mist filter according to an embodiment of the present disclosure. FIG. 3B illustrates a cross-sectional view taken along line III-III of FIG. 2, of a slidable coupling structure between a stationary filter and a movable filter according to an embodiment of the present disclosure. FIG. 4A illustrates a cross-sectional view taken on line IV-IV of FIG. 2, of a position of a movable filter with respect to a stationary filter in an air cleaning mode according to an embodiment of the present disclosure. FIG. 4B illustrates a view of a position of a movable filter with respect to a stationary filter in an oil mist collecting mode according to an embodiment of the present disclosure.

Referring to FIG. 2, the oil mist filter 40 may include a stationary filter 41 and a movable filter 45 connected to the stationary filter 41 to be moved in either a first position (e.g., air cleaning mode, FIG. 4A) or a second position (e.g., oil mist collecting mode, FIG. 4B) with respect to the stationary filter 41.

The stationary filter 41 may include a rectangular frame 42 forming an outer frame of the stationary filter 41, and a plurality of first baffles 43 (FIG. 4A) disposed in a vertical direction (Z-axis direction) at equal intervals on an inner side of the rectangular frame 42.

Referring to FIG. 4A, each of the first baffles 43 may be bent two times, forming a cross section of a groove that has an opening. Therefore, each of the first baffles 43 may have a center 43a, and a left side 43b and a right side 43c extending from both ends of the center 43a at a certain angle, respectively. In this example, the left side 43b and the right side 43c may be symmetrically disposed based on the center 43a as they are bent by the same angle from the center 43a toward the movable filter 45.

As described above, forming the first baffle 43 such that the cross section thereof has a shape of a groove with an opening may maximize the area of collecting oil mists, in consideration of the size of the stationary filter 41 that is determined in advance.

Referring to FIG. 3A, the stationary filter 41 may have a plurality of coupling holes 42a, 42b on a rear side of the rectangular frame 42, with which a plurality of coupling projections 35a, 35b of the pre-filter 35 are snap-fitted. Accordingly, the stationary filter 41 may be disposed in a fixed state in front of the pre-filter 35.

Referring to FIG. 3B, the stationary filter 41 may have a guide projection 42c projected from a front side of the rectangular frame 42. Specifically, the guide projections 42c may be formed along upper and lower portions of the rectangular frame 42, except the left and right portions of the rectangular frame 42.

The guide projection 42c of the stationary filter 41 may be slidably coupled with the sliding groove 46b formed on a rear side of the rectangular frame 46 of the movable filter 45.

Accordingly, the movable filter 45 may be moved in left and right directions (X-axis direction) with respect to the stationary filter 41.

In this example, when the guide projection 42*c* is formed on the rectangular frame 46 of the movable filter, the sliding groove 46*b* may be formed on the rectangular frame 42 of the stationary filter.

Referring to FIGS. 2 and 4A, the movable filter 45 may include the rectangular frame 46 having the same size as that of the rectangular frame of the stationary filter 41, and a plurality of second baffles 47 disposed in a vertical direction (Z-axis direction) at equal intervals on an inner side of the rectangular frame 46.

Likewise the first baffle 43, each of the second baffles 47 may be bent two times, forming a cross section of a groove that has an opening. That is, each of the second baffles 47 may have a center 47*a*, and a left side 47*b* and a right side 47*c* extending from both ends of the center 47*a* at a certain angle, respectively. In this example, the left side 47*b* and the right side 47*c* may be symmetrically disposed based on the center 47*a* as they are bent by the same angle from the center 47*a* toward the stationary filter 41.

Interval between a plurality of second baffles 47 may be same as that between a plurality of first baffles 43. Further, a plurality of second baffles 47 may be disposed correspondingly to a plurality of first baffles 43. In this example, each of the second baffles 47 may be disposed symmetrically with the corresponding first baffle 43.

Such cross-sectional shapes of the first and second baffles 43, 47 and arrangement of each of the first baffles 43 with the corresponding second baffles 47 are in consideration of the configuration that a first air path P1 of the oil mist filter 40 (FIG. 5A) may be simple in the air cleaning mode (where the movable filter 45 is moved to the first position) as in FIG. 4A, while a second air path P2 of the oil mist filter 40 (FIG. 5B) may be complex in the oil mist collecting mode (where the movable filter is moved to the second position).

A plurality of first and second baffles 43, 47 may be formed from a metal material (stainless steel (SUS), aluminum (Al)) or synthetic resin material (polypropylene (PP), polycarbonate (PC)) for semi-permanent use thereof.

Figure 5A:
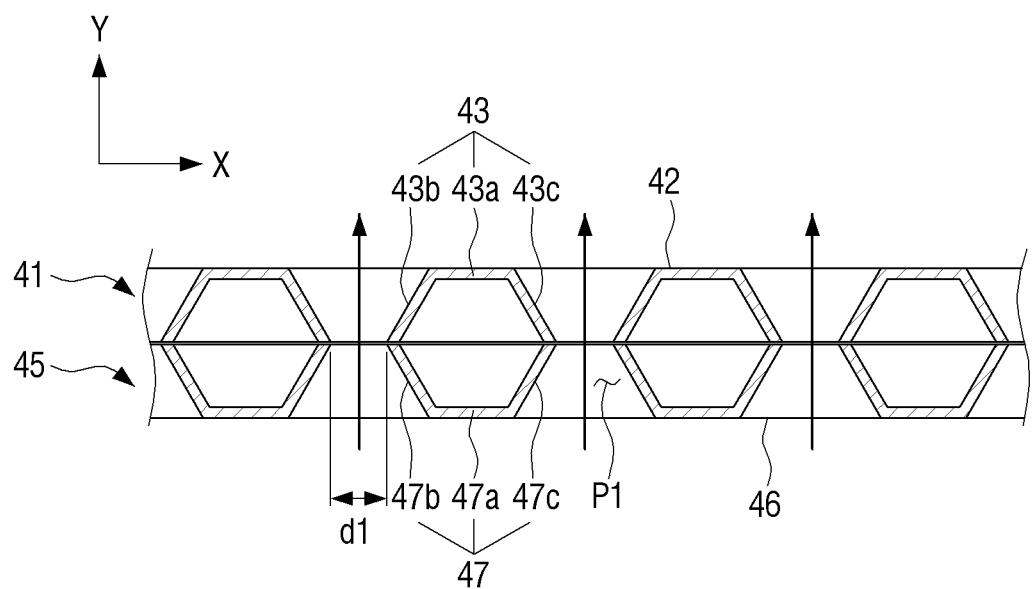
FIG. 5A illustrates a view of a state in which air passes between a stationary filter and a movable filter in an air cleaning mode according to an embodiment of the present disclosure.

FIG. 5A illustrates a view of a state in which air passes between a stationary filter and a movable filter in an air cleaning mode according to an embodiment of the present disclosure. Referring to FIG. 5A, the movable filter 45 may be disposed in the first position in the air cleaning mode. A plurality of second baffles 47 of the movable filter 45 in the first position may be disposed symmetrically with a plurality of first baffles 43 of the stationary filter 41. Accordingly, the air introduced through the intake holes 13 of the front cover 11 may pass through the first air path P1 almost without being interfered by a plurality of first and second baffles 43, 47. Therefore, the air cleaner 1 according to an embodiment may have air cleaning performance that is same as, or almost equivalent to air cleaning performance of a related air cleaner in the air cleaning mode.

Figure 5B:
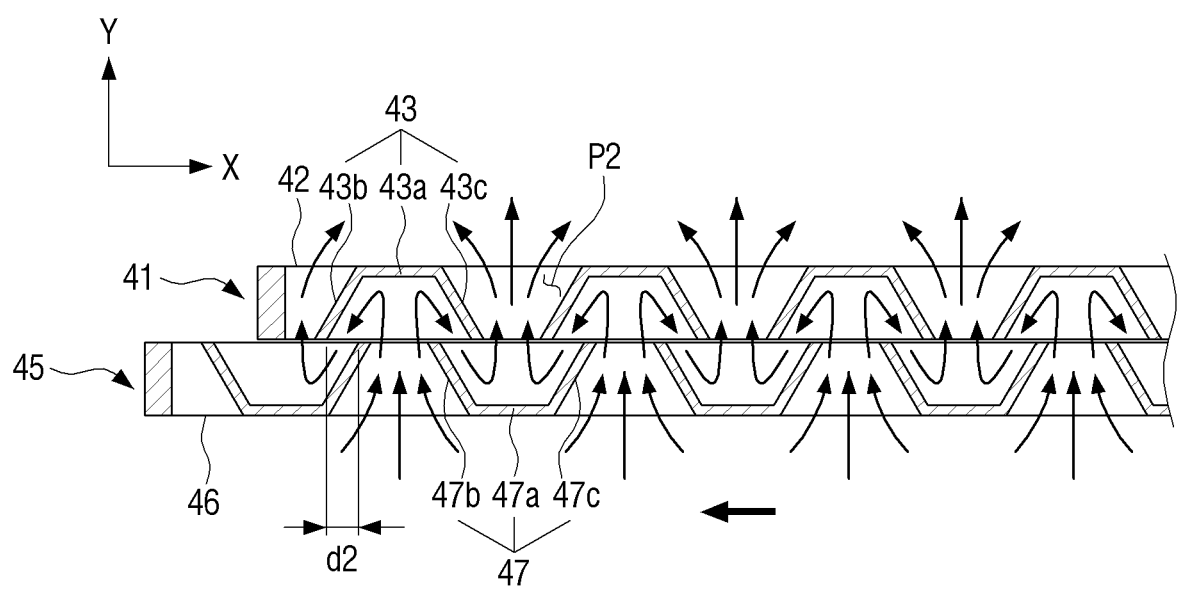
FIG. 5B illustrates a view of a state in which oil mist is collected between a stationary filter and a movable filter in an oil mist collecting mode according to an embodiment of the present disclosure.

FIG. 5B illustrates a view of a state in which oil mist is collected between a stationary filter and a movable filter in an oil mist collecting mode according to an embodiment of the present disclosure. Referring to FIG. 5B, the air cleaner 1 may change the air cleaning mode into the oil mist collecting mode as the movable filter 45 is moved to the second position by a preset distance according to the mode selecting knob 20 being pushed to the left along the X-axis direction.

In the oil mist collecting mode, the second air path P2 formed between the stationary filter 41 and the movable filter 45 may be in a complex form compared to the first air path P1. Accordingly, the air introduced through the intake holes 13 of the front cover 11 may receive more interferences when passing through the second air path P2.

An entrance is gradually narrowed as the air enters the second air path P2 (i.e., between the left sides 47*b* and the right sides 47*c* of the adjacent second baffles 47) and accordingly, air is compressed along the path. The air that has passed through the entrance then collides against the center 43*a* of a plurality of first baffles 43 to thus rotate approximately in an opposite direction to the direction of entrance, along the left sides 43*b* and the right sides 43*c* of the first baffle 43. In this example, oil mist included in the air is attached to the centers 43*a*, the left sides 43*b* and the right sides 43*c* of a plurality of first baffles 43.

The air then moves along the left sides 47*b* and the right sides 47*c* of a plurality of second baffles 47 until it collides against the centers 47*a* of a plurality of second baffles 47, after which the air is rotated and moved to a side of the pre-filter 35 through an outlet (between the left sides 43*b* and the right sides 43*c* of the adjacent first baffles). In this example, oil mist included in the air is attached to the centers 47*a*, the left sides 47*b* and the right sides 47*c* of a plurality of second baffles 47.

Oil mist entrained in the air can be effectively collected in a plurality of first and second baffles 43, 47 while moving along the second air path P2 formed between the movable filter 45 and the stationary filter 41.

Meanwhile, the air cleaner 1 that additionally includes the oil mist filter 40 according to an embodiment may have a slightly increased pressure loss in the air cleaning mode, compared to a related air cleaner that is provided with the air cleaning function only. However, as shown in Table 1 below, the air cleaner 1 has a similar level of 0.6 mmAq to 0.8 mmAq to a related air cleaner in the air cleaning mode. Further, the pressure in the oil mist collecting mode was measured as 3.7 mmAq to 5.5 mmAq, which was somewhat higher than in the air cleaning mode.

TABLE 1

| Mode | Separation distance (mm) between the first baffle and the second baffle | Pressure (mmAq) |
| --- | --- | --- |
| Oil mist collecting mode | 1 | 5.5 |
|  | 3 | 4.6 |
|  | 5 | 3.7 |
| Air cleaning mode | 1 | 0.8 |
|  | 3 | 0.8 |
|  | 5 | 0.6 |

Table 1 above lists measurements obtained at wind velocity of 1 m/s, and effective area of the oil mist filter of 285 mm×275 mm.

Further, the collection efficiency was measured per particle size of the oil mist using the light scattering method and listed in Table 2 below. The measurements indicated that the 2 μm or larger oil particles were collected at a high rate of 90% or above. Although Table 2 indicates that the collection rate of 1 μm or smaller oil particles was lower than the collection rate of 2 μm or larger oil particles, this does not affect the overall collection efficiency because 1 μm or smaller oil particles occupy about 2.9% of the entire oil amount, which is negligible.

TABLE 2

| | | Oil particle size (μm) | | | | | |
|---|---|---|---|---|---|---|---|
| | | 0.3 | 0.5 | 1 | 2 | 5 | 10 |
| Separation distance (mm) between first and second baffles | 1 | 22.3 | 32.6 | 60.2 | 89.1 | 100.0 | 100.0 |
| | 3 | 26.9 | 36.7 | 63.7 | 91.1 | 100.0 | 100.0 |
| | 5 | 23.0 | 32.3 | 60.9 | 90.5 | 100.0 | 100.0 |

In the embodiments described above, it was described that a plurality of first and second baffles 43, 47 have a shape of groove that has a cross section bent two times, but embodiments are not limited thereto. Accordingly, the cross section may take various shapes. The following will explain embodiments in which the first and second baffles have various shapes of cross sections, by referring to FIGS. 6A to 9B. FIGS. 6A to 9B illustrate respective baffles of a stationary filter and a movable filter have various cross-sections according to an embodiment of the present disclosure.

Figure 6A:
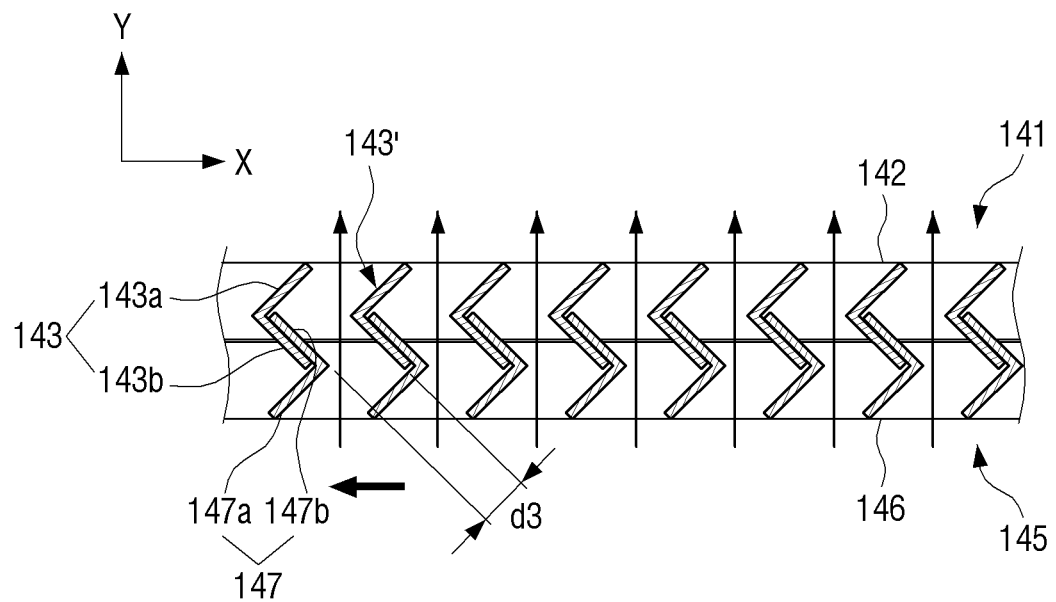
FIGS. 6A to 9B illustrate respective baffles of a stationary filter and a movable filter have various cross-sections according to an embodiment of the present disclosure.
Figure 6B:
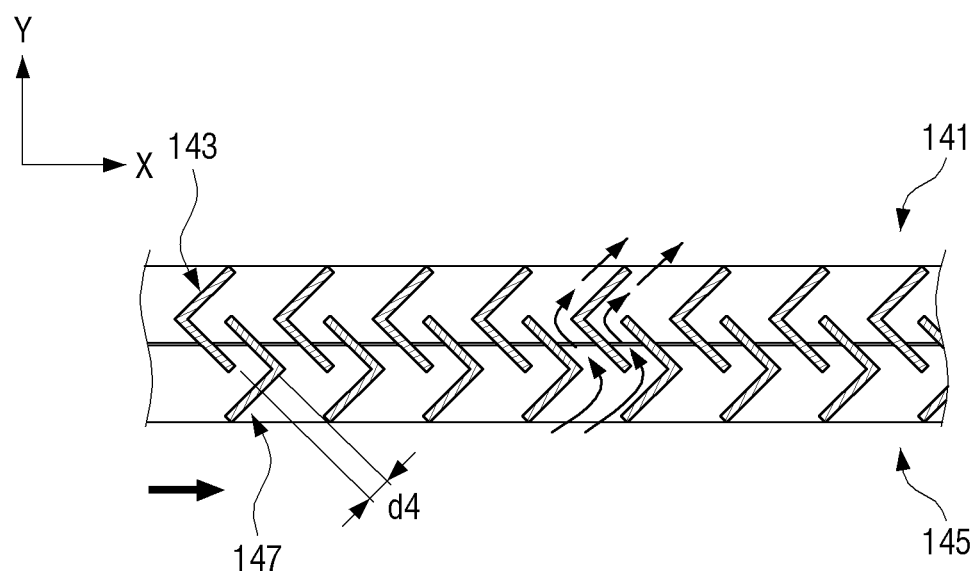

Referring to FIG. 6A, a plurality of first baffles 143 of the stationary filter 141 may have a V-shape in cross section, and may include first and second portions 143a, 143b. The first and second portions 143a, 143b may be formed symmetrically with each other. In this example, the first portion 143a may be fixed on the rectangular frame 142, and the second portion 143b may be partially projected toward the second baffle 147 from the rectangular frame 142. A plurality of first baffles 143 may be disposed at equal intervals.

Likewise the first baffles 143, a plurality of second baffles 147 of the movable filter 145 may have a V-shape in cross section and may include the first and second portions 147a, 147b. The first and second portions 147a, 147b may be formed symmetrically with each other. The first portion 147a may be fixed on the rectangular frame 146, and the second portion 147b may be partially projected toward the first baffle 143 from the rectangular frame 146.

Each of the first baffles 143 and each of the corresponding second baffles 147 may be disposed symmetrically, and interval between the first baffles 143 may be the same as that between the second baffles 147.

Referring to FIG. 6A, in the air cleaning mode, the movable filter 145 may be in a first position that is moved a certain distance to the left along X-axis direction. In this example, the second baffles 147 may be closest to their corresponding first baffles 143, and farthest away from their non-corresponding first baffle 143'. The interval (d3) between the second baffles 147 and the farthest non-corresponding first baffles 143' may be greater than the interval (d4, see FIG. 6B) between the second baffles 147 and the corresponding first baffles 143 in the oil mist collecting mode. Accordingly, the first air path composed of a plurality of first and second baffles 143, 147 may be simple in the air cleaning mode, and interference with the air passing through the movable filter 145 and the stationary filter 141 can be minimized.

Referring to FIG. 6A, in the oil mist collecting mode, the movable filter 145 may be in a second position that is moved a certain distance to the right along X-axis direction. In this example, the second air path composed of the first and second baffles 143, 147 may be complex compared to the first air path. Accordingly, the oil mists entrained in the air and passes through the second air path are attached to the first and second baffles 143, 147 upon colliding against the first and second baffles 143, 147.

In the oil mist collecting mode, the oil mists can be effectively collected by the second air path of a complex structure that is composed of the first and second baffles 143, 147.

Figure 7A:
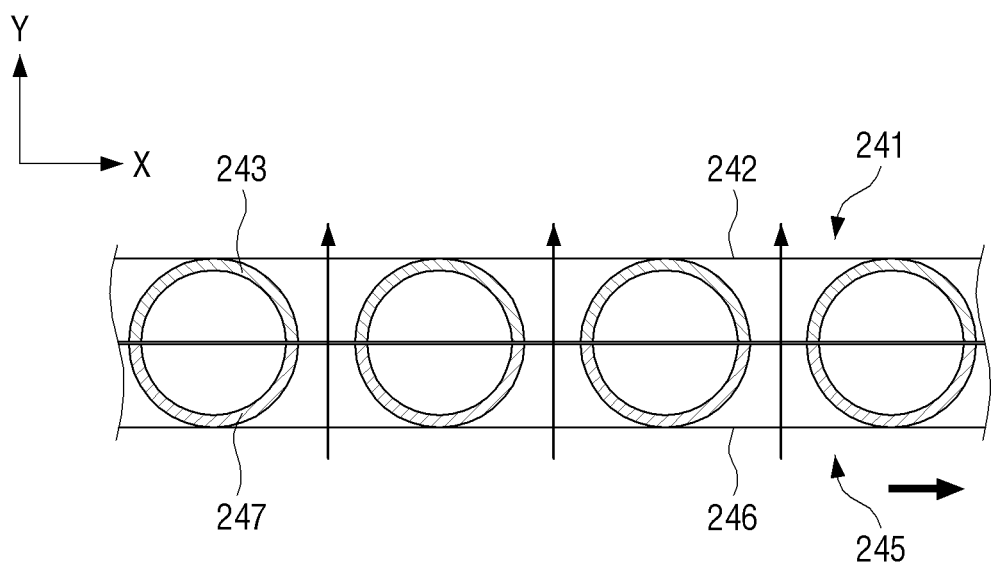

Referring to FIG. 7A, a plurality of first baffles 243 of the stationary filter 241 may have a circular-arc shape in cross section. A plurality of first baffles 243 may be fixed on the rectangular frame 242 with openings thereof facing toward the second baffles 247. A plurality of first baffles 243 may be disposed at equal intervals.

Likewise the first baffles 243, a plurality of second baffles 247 of the movable filter 245 may have a circular-arc shape in cross section. A plurality of second baffles 247 may be fixed on the rectangular frame 246 with openings thereof facing toward the first baffles 243. A plurality of second baffles 247 may be disposed at equal intervals.

Each of the first baffles 243 and each of the corresponding second baffles 247 may be disposed symmetrically, and interval between the first baffles 243 may be the same as that between the second baffles 247.

Referring to FIG. 7A, in the air cleaning mode, the movable filter 245 may be in a first position that is moved a certain distance to the right along X-axis direction. In this example, the second baffles 247 may be disposed symmetrically with the corresponding first baffles 243. Accordingly, the first air path composed of a plurality of first and second baffles 243, 247 may be simple in the air cleaning mode, and interference with the air passing through the movable filter 245 and the stationary filter 241 can be minimized.

Figure 7B:
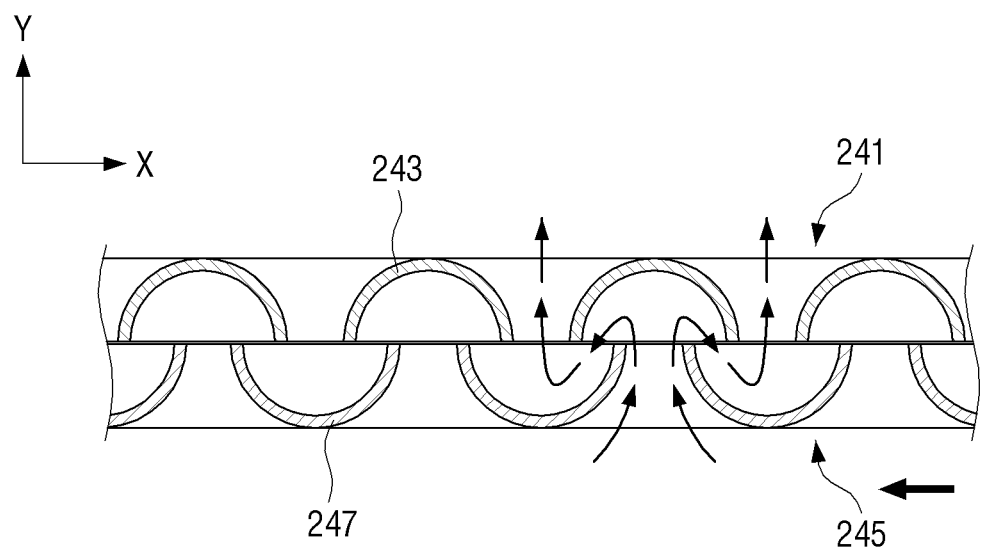

Referring to FIG. 7B, in the oil mist collecting mode, the movable filter 245 may be in a second position that is moved a certain distance to the left along X-axis direction. In this example, the second air path composed of the first and second baffles 243, 247 may be complex compared to the first air path. Accordingly, the oil mists entrained in the air and passes through the second air path are attached to the first and second baffles 243, 247 upon colliding against the first and second baffles 243, 247.

As described above, in the oil mist collecting mode, the oil mists can be effectively collected by the second air path of a relatively complex structure.

Figure 8A:
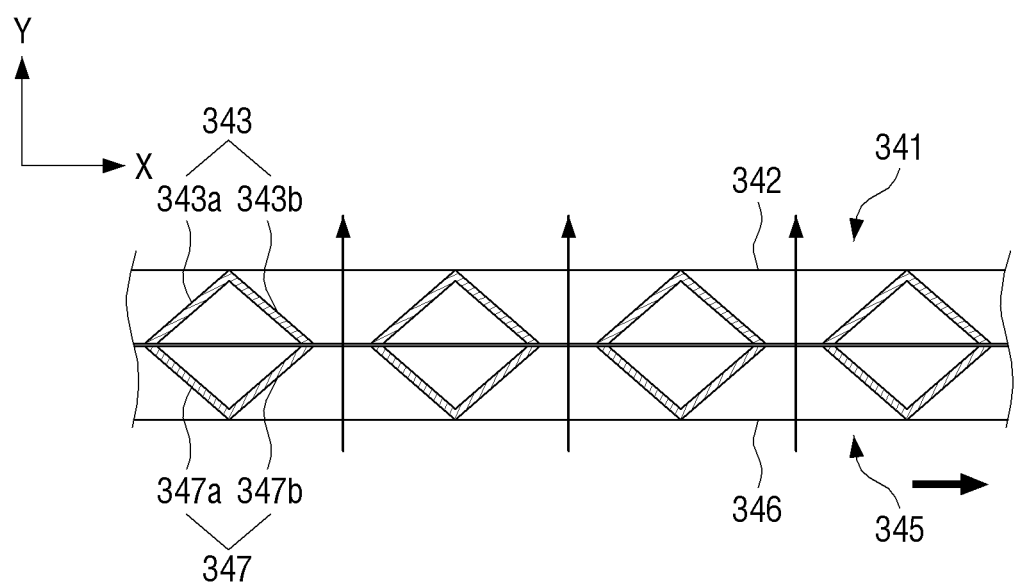

Referring to FIG. 8A, a plurality of first baffles 343 of the stationary filter 341 may have a V-shape in cross section. A plurality of first baffles 343 may be fixed on the rectangular frame 342 with openings thereof facing toward the second baffles 347. A plurality of first baffles 343 may be disposed at equal intervals.

Likewise the first baffles 343, a plurality of second baffles 347 of the movable filter 345 may have a V-shape in cross section. A plurality of second baffles 347 may be fixed on the rectangular frame 346 with openings thereof facing toward the first baffles 343. A plurality of second baffles 347 may be disposed at equal intervals.

Each of the first baffles 343 and each of the corresponding second baffles 347 may be disposed symmetrically, and interval between the first baffles 343 may be the same as that between the second baffles 347.

Referring to FIG. 8A, in the air cleaning mode, the movable filter 345 may be in a first position that is moved a certain distance to the right along X-axis direction. In this example, the second baffles 347 may be disposed symmetrically with the corresponding first baffles 343. Accordingly, the first air path composed of a plurality of first and second baffles 343, 347 may be simple in the air cleaning mode, and interference with the air passing through the movable filter 345 and the stationary filter 341 can be minimized.

Figure 8B:
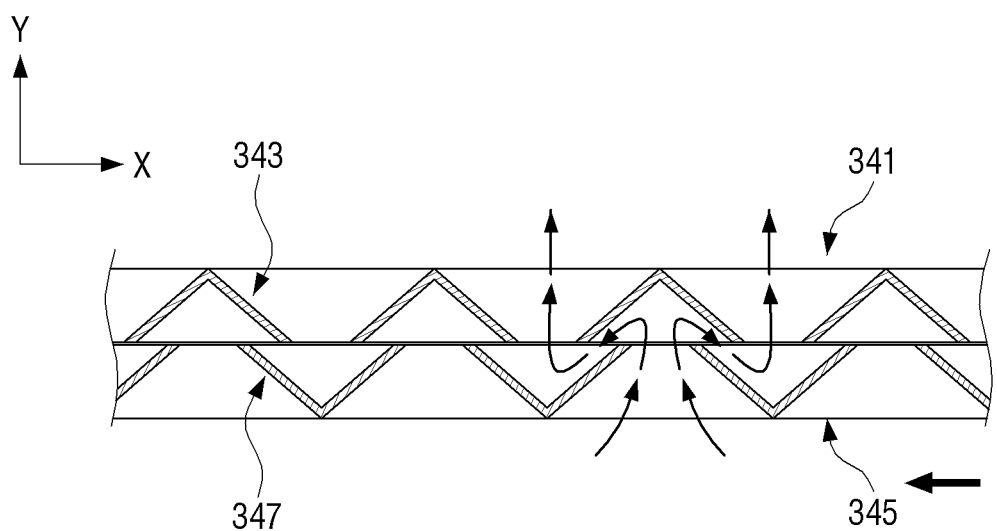

Referring to FIG. 8B, in the oil mist collecting mode, the movable filter 345 may be in a second position that is moved a certain distance to the left along X-axis direction. In this example, the second air path composed of the first and second baffles 343, 347 may be complex compared to the first air path. Accordingly, the oil mists entrained in the air and passes through the second air path are attached to the first and second baffles 343, 347 upon colliding against the first and second baffles 343, 347.

As described above, in the oil mist collecting mode, the oil mists can be effectively collected by the second air path of a relatively complex structure.

Figure 9A:
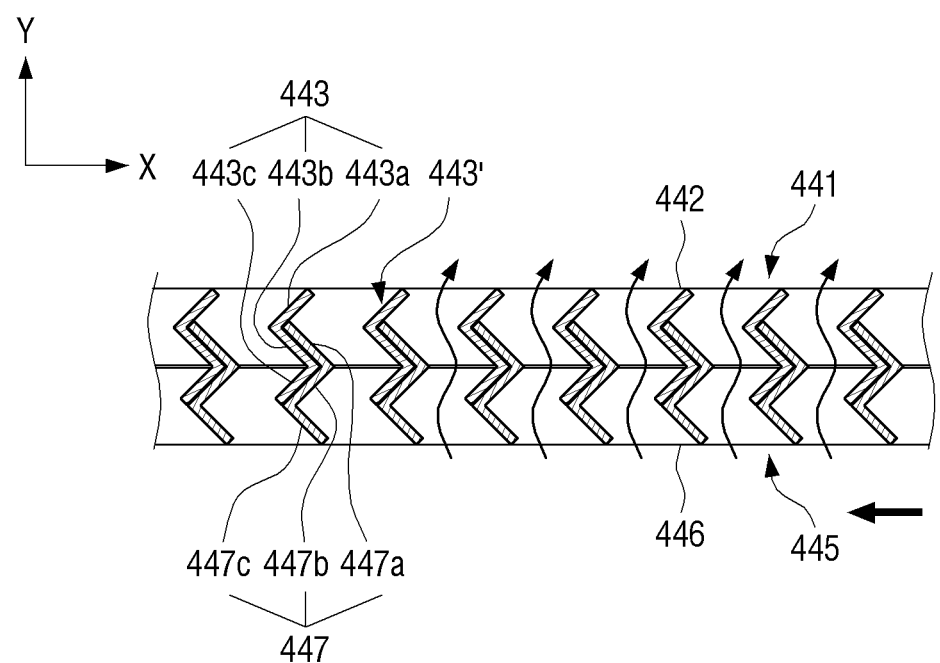

Referring to FIG. 9A, a plurality of first baffles 443 of the stationary filter 441 may have a Chevron-shape in cross section, and may include first to third portions 443a, 443b, 443c. The first and second portions 443a, 443b may be fixed on the rectangular frame 442, and the third portion 443c may be partially projected toward the second baffle 447 from the rectangular frame 442. A plurality of first baffles 443 may be disposed at equal intervals.

Likewise the first baffles 443, a plurality of second baffles 447 of the movable filter 445 may have a Chevron-shape in cross section and may include the first to second portions 447a, 447b, 447c. The first and second portions 447a, 447b may be fixed on the rectangular frame 446, and the third portion 447c may be partially projected toward the first baffle 443 from the rectangular frame 446.

The interval between the respective first baffles 143 may be same as that between the respective second baffles 147.

Referring to FIG. 9A, in the air cleaning mode, the movable filter 445 may be in a first position that is moved a certain distance to the left along X-axis direction. In this example, the second baffles 447 may be closest to their corresponding first baffles 443, and farthest away from their non-corresponding first baffle 443'. The interval between the second baffles 447 and the farthest non-corresponding first baffles 443' may be greater than the interval between the second baffles 447 and the corresponding first baffles 443 in the oil mist collecting mode. Accordingly, the first air path composed of a plurality of first and second baffles 443, 447 may be simple in the air cleaning mode, and interference with the air passing through the movable filter 445 and the stationary filter 441 can be minimized.

Figure 9B:
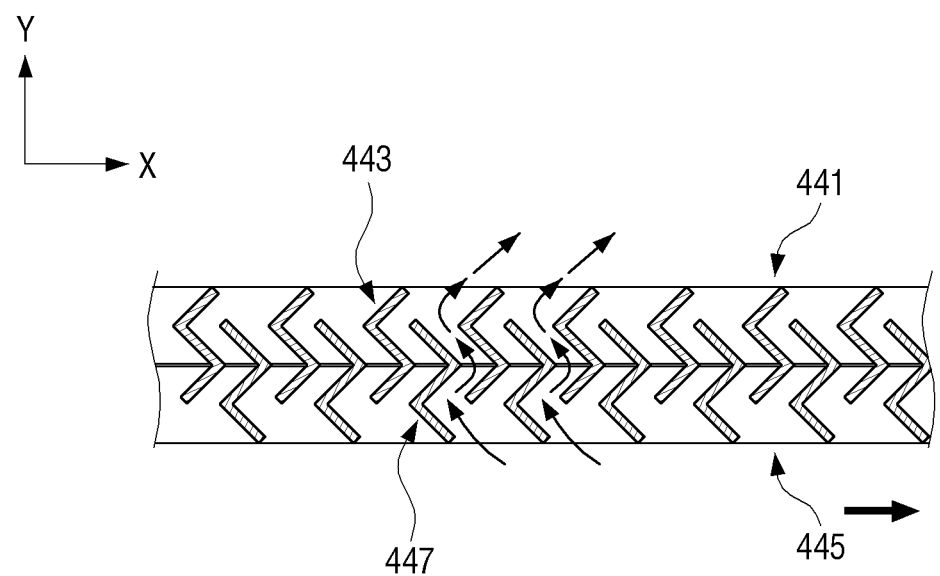

Referring to FIG. 9B, in the oil mist collecting mode, the movable filter 445 may be in a second position that is moved a certain distance to the right along X-axis direction. In this example, the second air path composed of the first and second baffles 443, 447 may be complex compared to the first air path. Accordingly, the oil mists entrained in the air and passes through the second air path are attached to the first and second baffles 443, 447 upon colliding against the first and second baffles 443, 447.

In the oil mist collecting mode, the oil mists can be effectively collected by the second air path of a complex structure that is composed of the first and second baffles 443, 447.

Figure 10A:
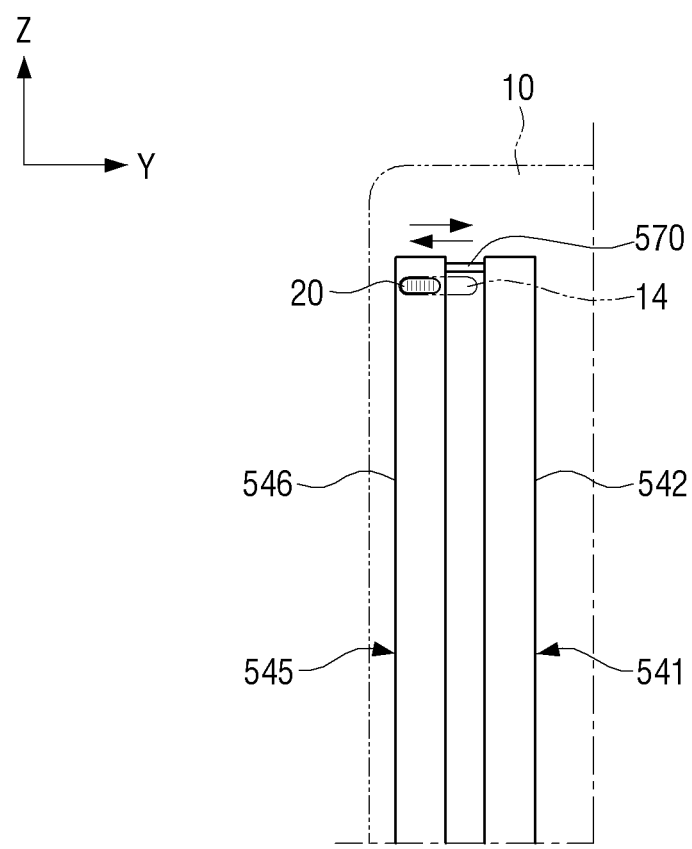
FIGS. 10A and 10B illustrate an oil mist filter with respective positions of a movable filter with respect to a stationary filter in air cleaning mode and oil mist collecting mode according to an embodiment of the present disclosure.
Figure 10B:
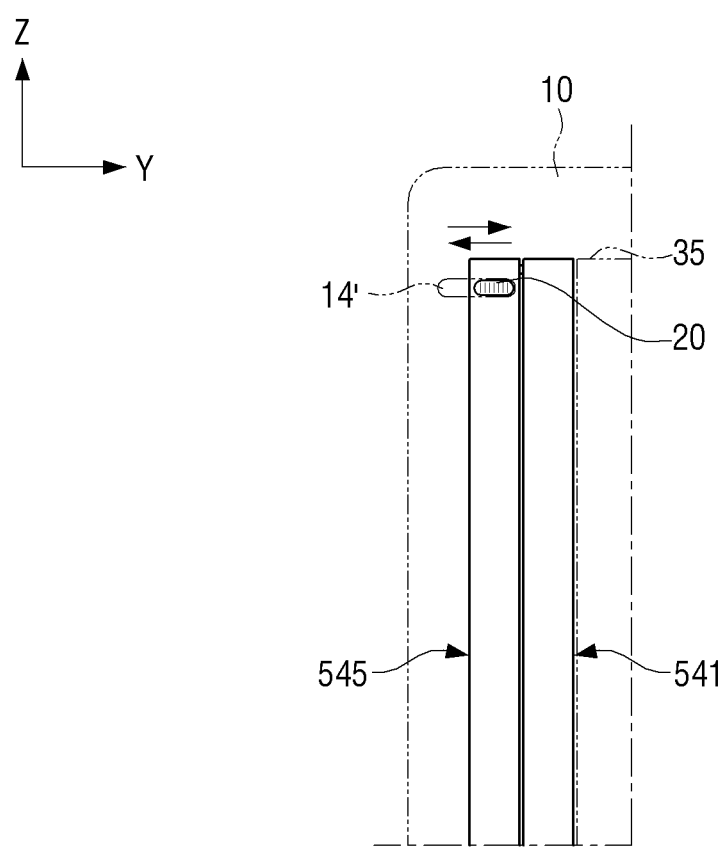
Figure 11A:
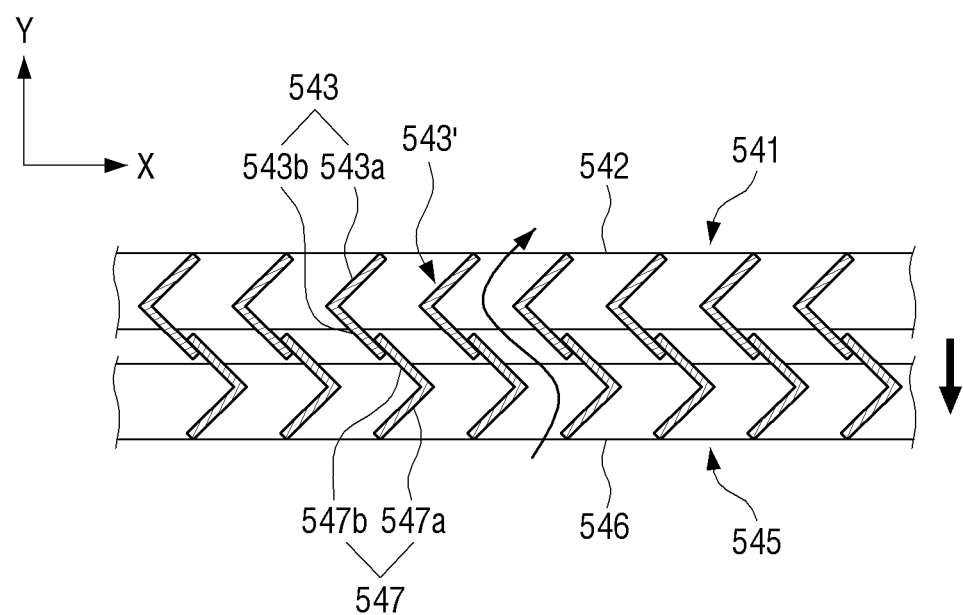
FIGS. 11A and 11B illustrate arrangement of a plurality of baffles of a stationary filter and a plurality of baffles of a movable filter in an air cleaning mode and oil mist collecting mode according to an embodiment of the present disclosure.
Figure 11B:
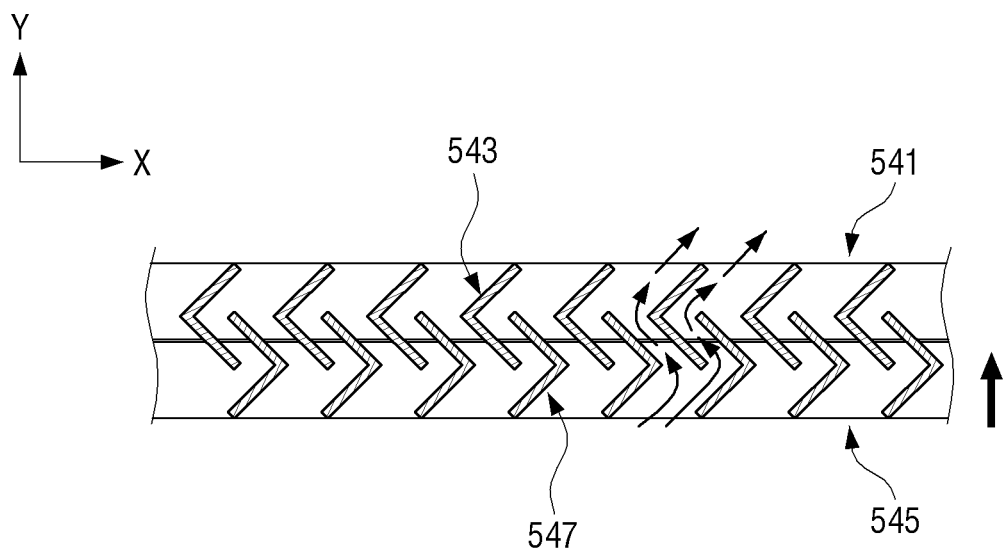

The oil mist filter described above may be set to either the air cleaning mode or the oil mist collecting mode according to the movable filter moving to either the first position or the second position along a horizontal direction (X-axis direction) with respect to the stationary filter. However, embodiments are not limited thereto, and as shown in FIGS. 10A to 11B, the oil mist filter may be set to either the air cleaning mode or the oil mist collecting mode according to the movable filter moving to either the first position or the second position along a direction farther away from, or closer to the stationary filter. FIGS. 10A and 10B illustrate an oil mist filter with respective positions of a movable filter with respect to a stationary filter in air cleaning mode and oil mist collecting mode according to an embodiment of the present disclosure. FIGS. 11A and 11B illustrate arrangement of a plurality of baffles of a stationary filter and a plurality of baffles of a movable filter in an air cleaning mode and oil mist collecting mode according to an embodiment of the present disclosure.

Referring to FIGS. 10A and 10B, the movable filter 545 may be disposed to be moved in a vertical direction (Y-axis direction) with respect to the stationary filter 541. In this example, the movable filter 545 may be moved along a guide rail 570.

Referring to FIG. 10A, one end of the guide rail 570 may be fixed on the rectangular frame 542 of the stationary filter 541, and the other end may be slidably coupled with a guide hole (not illustrated) formed on the rectangular frame 546 of the movable filter 545. A plurality of guide rails 570 may be disposed in parallel on upper and lower sides or left and right sides of each of the rectangular frames 542, 546 symmetrically, to enable the movable filter 545 to move smoothly along a vertical direction (Y-axis direction). In this example, when the guide rail 570 is formed on the rectangular frame 546 of the movable filter, the guide hole may be formed on the rectangular frame 542 of the stationary filter.

The mode selecting knob 20' may be disposed on a side of the main body 10, and a coupling projection (not illustrated) of the mode selecting knob 20' may be engaged with a coupling hole (not illustrated) formed in the rectangular frame 542 of the movable filter 545. In this example, an insertion groove 14 is formed along Y-axis direction on a side of the main body 10, through which the mode selecting knob 20' is slidably inserted.

When the mode selecting knob 20' is moved to the left along Y-axis direction to set the air cleaning mode, the movable filter 545 may be moved to the first position that is farthest away from the stationary filter 541.

Referring to FIG. 10B, when the mode selecting knob 20' is moved to the right along Y-axis direction to set the oil mist collecting mode, the movable filter 545 may be moved to the second position that is close to the stationary filter 541.

As described above, a user may set the air cleaning mode or the oil mist collecting mode through simple operation of moving the mode selecting knob 20' disposed on a side of the main body 10 in left and right directions.

In this example, a plurality of first baffles 543 of the stationary filter 541 and a plurality of second baffles 547 of the movable filter 545 may be provided in the same cross section and same interval as those of a plurality of first baffles 143 of the stationary filter 141 and a plurality of second baffles 147 of the movable filter 145 described above by referring to FIG. 6A.

Referring to FIG. 11A, a plurality of first baffles 543 of the stationary filter 541 may have a V-shape in cross section, and may include first and second portions 543a, 543b. The first and second portions 543a, 543b may be formed symmetrically with each other. In this example, the first portion 543a may be fixed on the rectangular frame 542, and the second portion 543a may be partially projected toward the second baffle 547 from the rectangular frame 542. A plurality of first baffles 543 may be disposed at equal intervals.

Likewise the first baffles 543, a plurality of second baffles 547 of the movable filter 545 may have a V-shape in cross section and may include the first and second portions 547a, 547b. The first and second portions 547a, 547b may be formed symmetrically with each other. The first portion 547a may be fixed on the rectangular frame 546, and the second portion 547b may be partially projected toward the first baffle 543 from the rectangular frame 546.

Each of the first baffles 543 and each of the corresponding second baffles 547 may be disposed symmetrically, and interval between the first baffles 543 may be the same as that between the second baffles 547.

Referring to FIG. 11A, in the air cleaning mode, the movable filter 545 may be in a first position that is moved a certain distance downward along X-axis direction. In this example, the second baffles 547 may be closest to their corresponding first baffles 543, and farthest away from their non-corresponding first baffle 543'. The interval between the second baffles 547 and the farthest non-corresponding first baffles 543' may be greater than the interval between the second baffles 547 and the corresponding first baffles 543 in the oil mist collecting mode. Accordingly, the first air path composed of a plurality of first and second baffles 543, 547 may be simple in the air cleaning mode, and interference with the air passing through the movable filter 545 and the stationary filter 541 can be minimized.

Referring to FIG. 11B, in the oil mist collecting mode, the movable filter 545 may be in a second position that is moved a certain distance upward along Y-axis direction. In this example, the second air path composed of the first and second baffles 543, 547 may be complex compared to the first air path. Accordingly, the oil mists entrained in the air and passes through the second air path are attached to the first and second baffles 543, 547 upon colliding against the first and second baffles 543, 547.

In the oil mist collecting mode, the oil mists can be effectively collected by the second air path of a complex structure that is composed of the first and second baffles 543, 547.

Figure 12A:
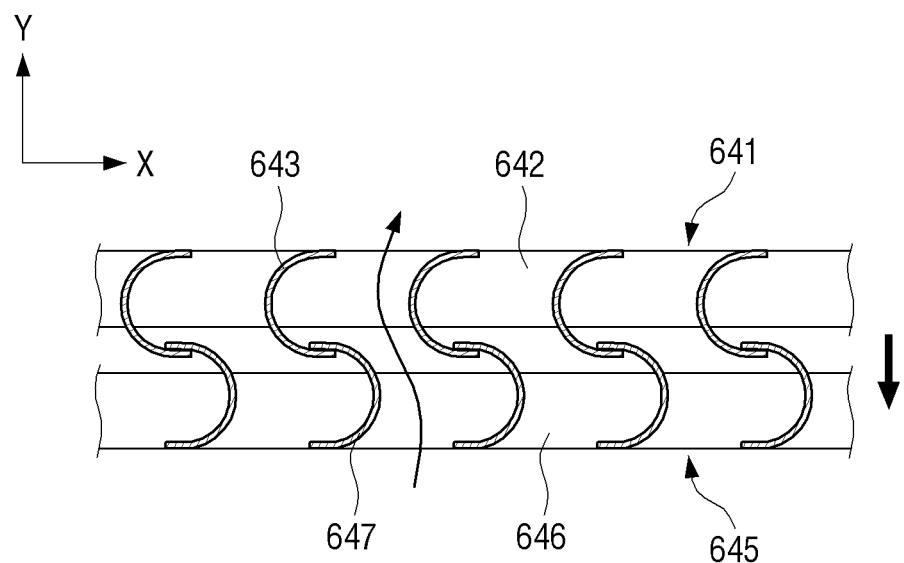
FIGS. 12A and 12B illustrate a plurality of baffles of a stationary filter and a plurality of baffles of a movable filter having circular-arc shape, which respectively illustrates an arrangement of a plurality of baffles of a stationary filter and a plurality of baffles of a movable filter according to an embodiment of the present disclosure.
Figure 12B:
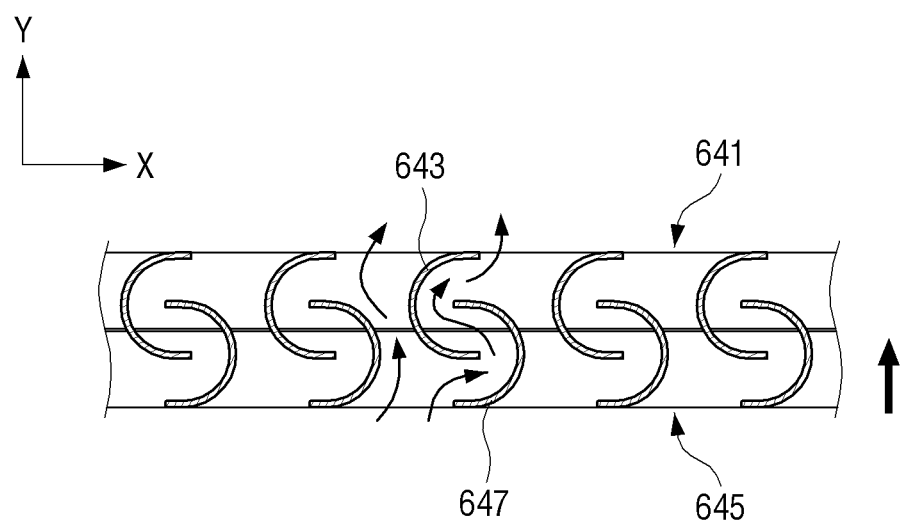
Figure 13A:
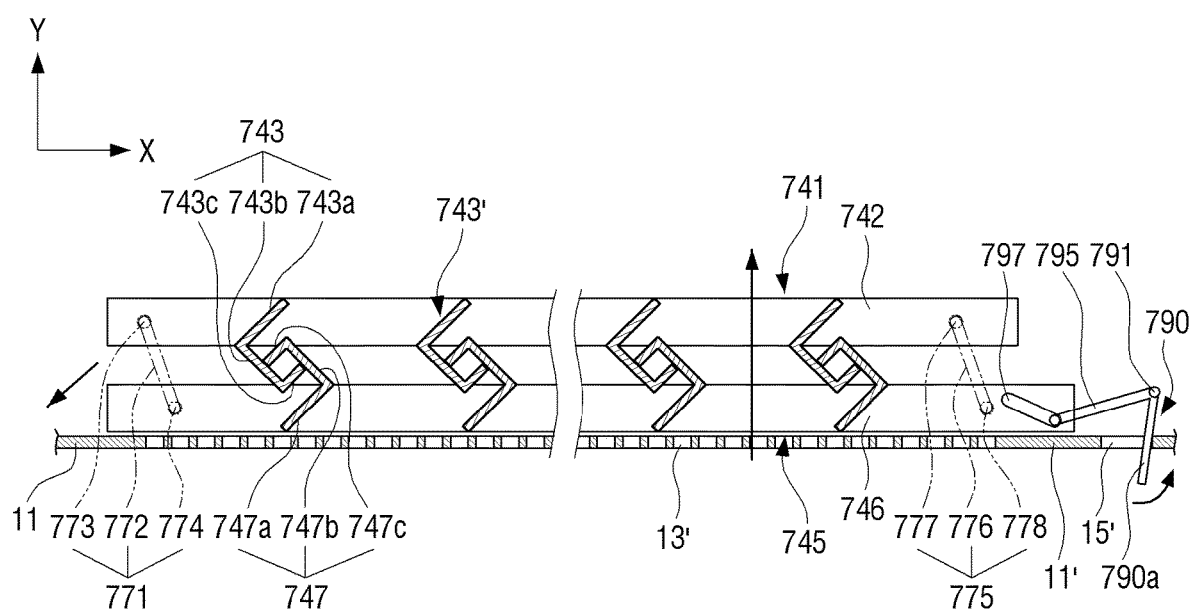
FIGS. 13A and 13B illustrate an oil mist filter with respective positions of a movable filter with respect to a stationary filter in an air cleaning mode and oil mist collecting mode according to an embodiment of the present disclosure.
Figure 13B:
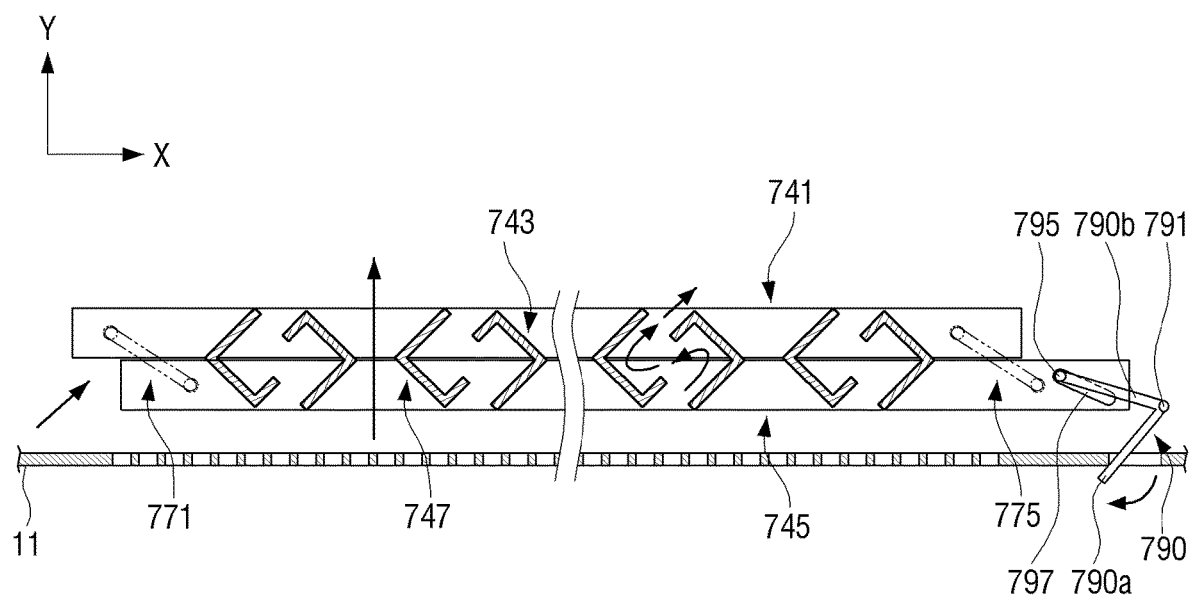

In the embodiments described above, it was described that a plurality of first and second baffles 543, 547 have a V-shape in cross section, but embodiments are not limited thereto. Accordingly, the cross section may take various shapes. The following will explain embodiments in which the first and second baffles have various shapes of cross sections, by referring to FIGS. 12A to 13B. FIGS. 12A and 12B illustrate a plurality of baffles of a stationary filter and a plurality of baffles of a movable filter having circular-arc shape, which respectively illustrates an arrangement of a plurality of baffles of a stationary filter and a plurality of baffles of a movable filter according to an embodiment of the present disclosure. FIGS. 13A and 13B illustrate an oil mist filter with respective positions of a movable filter with respect to a stationary filter in an air cleaning mode and oil mist collecting mode according to an embodiment of the present disclosure.

Referring to FIG. 12A, a plurality of first baffles 643 of the stationary filter 641 may have a circular-arc shape in cross section. A plurality of first baffles 243 may be fixed on the rectangular frame 642 with openings thereof facing left in the X-axis direction. A plurality of first baffles 643 may be disposed at equal intervals.

Likewise the first baffles 643, a plurality of second baffles 647 of the movable filter 645 may have a circular-arc shape in cross section. A plurality of second baffles 647 may be fixed on the rectangular frame 646 with openings thereof facing right in the X-axis direction. A plurality of second baffles 647 may be disposed at equal intervals.

Each of the first baffles 643 and each of the corresponding second baffles 647 may be disposed symmetrically, and interval between the first baffles 643 may be the same as that between the second baffles 647.

Referring to FIG. 12A, in the air cleaning mode, the movable filter 645 may be in a first position that is moved a certain distance downward along X-axis direction. The first air path composed of a plurality of first and second baffles 643, 647 may be simple in the air cleaning mode, and interference with the air passing through the movable filter 645 and the stationary filter 641 can be minimized.

Referring to FIG. 12B, in the oil mist collecting mode, the movable filter 245 may be in a second position that is moved a certain distance upward along Y-axis direction. In this example, the second air path composed of the first and second baffles 643, 647 may be complex compared to the first air path. Accordingly, the oil mists entrained in the air and passes through the second air path are attached to the first and second baffles 643, 647 upon colliding against the first and second baffles 643, 647.

As described above, in the oil mist collecting mode, the oil mists can be effectively collected by the second air path of a relatively complex structure.

Meanwhile, the movable filter described above may be configured to move in a horizontal or a vertical direction with respect to the stationary filter, to set the air cleaning mode and the oil mist collecting mode. However, the moving direction of the movable filter may not be limited to horizontal or vertical direction, and accordingly, in another example, either the air cleaning mode or the oil mist collecting mode may be set by moving the movable filter in a diagonal direction.

By referring to FIGS. 13A and 13B, the following will describe examples in which the movable filter is moved in a diagonal direction with respect to the stationary filter.

Referring to FIG. 13A, a plurality of first baffles 743 of the stationary filter 741 may have an approximately groove shape that is bent two times in cross section, and may include first to third portions 743a, 743b, 743c. The first portion 743a may be fixed on the rectangular frame 742, and the second and third portions 743b, 743c may be bent clockwise and projected toward the second baffles 747 from the rectangular frame 742, respectively. A plurality of first baffles 743 may be disposed at equal intervals.

A plurality of second baffles 747 of the movable filter 745 may have an approximately groove shape that is bent two times in cross section, and may include first to third portions 747a, 747b, 747c. The first portion 747a may be fixed on the rectangular frame 746, and the second and third portions 747b, 747c may be bent counter-clockwise and projected toward the first baffles 743 from the rectangular frame 746, respectively. A plurality of second baffles 747 may be disposed at equal intervals.

The interval between the respective first baffles 743 may be same as that between the respective second baffles 747.

Both upper sides of the movable filter 745 may be connected to both upper sides of the stationary filter 741 through first and second hinge connecting parts 771, 775. Further, although not illustrated in drawings, both lower sides of the movable filter 745 may be connected to both lower sides of the stationary filter 741 through another first and second hinge connecting parts.

The first hinge connecting part 771 includes a connection rod 772, a first hinge axis 773 to hinge-connect one end of the connection rod 772 to the rectangular frame 742 of the stationary filter 741, and a second hinge axis 774 to hinge-connect the other end of the connection rod 772 to the rectangular frame of the movable filter 745. The second hinge connection part 775 also includes a connection rod 776 and first and second hinge axes 777, 778, likewise the first hinge connection part 771.

The movable filter 745 may be moved to the first position (e.g., air cleaning mode) and the second position (e.g., oil mist collecting mode) according to operation of a lever 790.

One end 790a of the lever 790 may be projected outside a cover 11' through a penetration hole 15' formed in one side of the cover 11' for easy access of a user. One end 790a and the other end 790b of the lever 790 may be bent at a certain angle, and a portion that joins the end 790a and the other end 790b may be hingedly connected to a portion of an inner side of the main body 10 through a hinge axis 791 so as to rotate clockwise and counter-clockwise.

The other end 790b of the lever 790 may be connected to the movable filter 745 through a connection pin 795. Specifically, the other end 790b of the lever 790 may be coupled with the connection pin 795, and the connection pin 795 may be slidably connected to a cam hole 797 having a shape of an elongate hole formed in the rectangular frame 746 of the movable filter 745.

In FIG. 13A, although not specifically described herein, a plurality of intake holes 13' is formed in the cover 11'.

Referring to FIG. 13A, when the one end 790a of the lever 790 is moved counter-clockwise to set the air cleaning mode, the movable filter 745 may be moved in the first diagonal direction to the first position that is closest to the stationary filter 741.

In this example, the second baffles 747 may be closest to their corresponding first baffles 743, and farthest away from their non-corresponding first baffle 743'. The interval between the second baffles 747 and the farthest non-corresponding first baffles 743' may be greater than the interval between the second baffles 747 and the corresponding first baffles 743 in the oil mist collecting mode. Accordingly, the first air path composed of a plurality of first and second baffles 743, 747 may be simple in the air cleaning mode, and interference with the air passing through the movable filter 745 and the stationary filter 741 can be minimized.

Referring to FIG. 13B, when the one end 790a of the lever 790 is moved clockwise to set the oil mist collecting mode, the movable filter 745 may be moved in the second diagonal direction that is opposite the first diagonal direction, to the second position that is farthest away from the stationary filter 741.

In this example, the second air path composed of the first and second baffles 743, 747 may be complex compared to the first air path. Accordingly, the oil mists entrained in the air and passes through the second air path are attached to the first and second baffles 743, 747 upon colliding against the first and second baffles 743, 747.

In the oil mist collecting mode, the oil mists can be effectively collected by the second air path of a complex structure that is composed of the first and second baffles 743, 747.

According to the embodiments described above, it is described above the user manually operates the mode selecting knob 20, 20' or the lever 790 to move the position of the movable filter and set either the air cleaning mode or the oil mist collecting mode.

However, the present disclosure is not limited thereto, and in some embodiments, the movable filter may be automatically moved to positions.

FIG. 14 illustrates a block diagram of an oil mist filter with an actuator according to an embodiment of the present disclosure. Referring to FIG. 14, the movable filter 845 may set either the air cleaning mode or the oil mist collecting mode by moving to the first or second position with the driving force generated and delivered from an actuator 7 through a connection part 8 of the actuator 7.

In this example, when the operating panel 4 is a touch screen, the operating panel 4 may display button images to allow a user to select the air cleaning mode and the oil mist collecting mode. When the user touches one of two button images displayed on the operating panel 4, a controller 3 may determine a command inputted through the operating panel 4 and drive the actuator 7.

The actuator 7 may use a motor, a paraffin actuator, or a thermostat actuator. The connection part 8 may be implemented a various shapes such as rotating axis, piston, lever or the like according to type of the actuator.

Meanwhile, when the operating panel 4 includes a display and a plurality of hardware input keys, a hardware input key to select the two modes described above may be added.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. An air cleaner, comprising:
   a main body comprising an inlet and an outlet and configured to forcibly intake external air through the inlet with a fan disposed therein and discharge the external air through the outlet; and
   a filter device comprising:
      at least one dust filter disposed in back of the inlet and configured to filter the external air introduced through the inlet, and
      an oil mist filter configured to filter oil mist from the external air introduced through the inlet,
   wherein the oil mist filter comprises:
      a stationary filter comprising a plurality of first baffles disposed in parallel at certain intervals the stationary filter is in a fixed position within the oil mist filter, and
      a movable filter comprising a plurality of second baffles disposed in parallel at certain intervals and respectively corresponding to the plurality of first baffles, the movable filter is moveable within the oil mist filter,
   wherein the movable filter is movably disposed on a side of the stationary filter and configured to be moved between a first position and a second position respect to the stationary filter, and
   wherein when the movable filter is moved to the first position, a direct air path from the inlet to the at least one dust filter is formed where the plurality of first and second baffles corresponding to each other are positioned closest to each other, and when the movable filter is moved to the second position, a diverted air path is formed where the plurality of first and second baffles corresponding to each other are farthest away from each other to redirect the air in multiple directions.

2. The air cleaner of claim 1, wherein:
   when the stationary filter comprises a guide projection, the movable filter comprises a sliding groove, when the stationary filter comprises the sliding groove, the movable filter comprises the guide projection, and the guide projection is slidably engaged in a horizontal direction.

3. The air cleaner of claim 1, wherein:
the movable filter or the stationary filter comprises a guide rail projecting in a direction farther away from, or closer to the stationary filter,
when the movable filter comprises the guide rail the stationary filter comprises a guide hole,
when the stationary filter comprises the guide rail the movable filter comprises the guide hole, and
the guide rail is slidably inserted into the guide hole.

4. The air cleaner of claim 1, wherein the movable filter is movably hinge-connected to the stationary filter in a diagonal direction through a plurality of hinge connection parts.

5. The air cleaner of claim 1, wherein the plurality of first and second baffles include a groove shape that is bent for at least once in cross section.

6. The air cleaner of claim 1, wherein the movable filter is connected to a mode selecting member to be moved to the first position or the second position, the mode selecting member is exposed outside the main body.

7. The air cleaner of claim 1, further comprising:
a controller disposed within the main body to control a motor;
an operating panel disposed outside the main body to receive an input of a user command; and
an actuator controlled by the controller according to the user command to the operating panel,
wherein the movable filter is connected to the actuator so as to receive a driving force from the actuator, and moved to the first position or the second position according to driving of the actuator.

8. The air cleaner of claim 1, wherein the plurality of second baffles are disposed symmetrically to correspond to the plurality of first baffles.

9. The air cleaner of claim 8 wherein the plurality of first and second baffles are at least one of a V-shape, a Chevron shape, and a circular-arc shape in cross section.

10. The air cleaner of claim 1, wherein the plurality of first and second baffles are bent for at least once to include a groove shape, wherein a cross section of the groove shape includes an opening, and
the plurality of first and second baffles corresponding to each other are disposed with each of the openings facing each other.

11. An oil mist filter, comprising:
a stationary filter comprising a plurality of first baffles disposed in parallel at certain intervals the stationary filter is in a fixed position within the oil mist filter; and
a movable filter comprising a plurality of second baffles disposed in parallel at certain intervals and respectively corresponding to the plurality of first baffles, the movable filter is moveable within the oil mist filter,
wherein the movable filter is movably disposed on one side of the stationary filter to be moved between a first position and a second position with respect to the stationary filter, and
wherein when the movable filter is moved to the first position, a direct air path from an inlet to an outlet is formed where the plurality of first and second baffles corresponding to each other are positioned closest to each other, and when the movable filter is moved to the second position, a diverted air path is formed where the plurality of first and second baffles corresponding to each other are farthest away from each other to redirect air in multiple directions.

12. The oil mist filter of claim 11, wherein the certain intervals between the plurality of first baffles is same as the certain intervals between the plurality of second baffles.

13. The oil mist filter of claim 11, wherein the movable filter is moved in a horizontal direction with respect to the stationary filter.

14. The oil mist filter of claim 11, wherein the movable filter is moved in a vertical direction with respect to the stationary filter.

15. The oil mist filter of claim 11, wherein the movable filter is hinge-connected to the stationary filter and moved in a diagonal direction.

16. The oil mist filter of claim 11, wherein the plurality of second baffles are disposed symmetrically to correspond to the plurality of first baffles.

17. The oil mist filter of claim 16, wherein the plurality of first and second baffles are at least one of a V-shape, a Chevron shape, and a circular-arc shape in cross section.

18. The oil mist filter of claim 11, wherein the plurality of first and second baffles are bent for at least once to include a groove shape, wherein a cross section of the groove shape includes an opening, and the plurality of first and second baffles corresponding to each other are disposed with each of the openings facing each other.

19. The oil mist filter of claim 11, wherein:
when the stationary filter comprises a guide projection, the movable filter comprises a sliding groove,
when the stationary filter comprises the sliding groove, the movable filter comprises the guide projection, and
the guide projection is slidably engaged in a horizontal direction.

20. The oil mist filter of claim 11, wherein:
the movable filter or the stationary filter comprises a guide rail projecting in a direction farther away from, or closer to the stationary filter,
when the movable filter comprises the guide rail the stationary filter comprises a guide hole,
when the stationary filter comprises the guide rail the movable filter comprises the guide hole, and
the guide rail is slidably inserted into the guide hole.

* * * * *